United States Patent [19]

Casiello

[11] Patent Number: 4,821,372
[45] Date of Patent: Apr. 18, 1989

[54] REUSABLE CONTAINER HANDLE

[76] Inventor: Nicholas Casiello, 1449 Briergate Dr., Naperville, Ill. 60540

[21] Appl. No.: 937,947

[22] Filed: Dec. 4, 1986

[51] Int. Cl.⁴ .............................................. B65D 23/10
[52] U.S. Cl. .................... 16/114 R; 239/375; 294/145; 222/465.1; 215/100 A
[58] Field of Search ........................ 16/114 A, 114 R; 294/145; 239/375, 325; 222/465 R, 467; 215/100 A

[56] References Cited

U.S. PATENT DOCUMENTS

| D. 159,292 | 7/1950 | Olson | 294/145 |
| 2,281,015 | 4/1942 | Weise | 16/114 A |
| 2,406,696 | 8/1946 | Leslie | 215/100 A |
| 2,803,383 | 8/1957 | Dickman et al. | 239/375 |
| 3,688,936 | 9/1972 | Killigrew, Jr. | 16/114 A |
| 4,120,073 | 10/1978 | Studebaker | 16/114 R |
| 4,273,246 | 6/1981 | Thompson | 215/100 A |
| 4,456,135 | 6/1984 | Beekes | 215/100 A |

FOREIGN PATENT DOCUMENTS

WO8302101 6/1983 PCT Int'l Appl. ............. 222/465.1

Primary Examiner—Nicholas P. Godici
Assistant Examiner—Samuel M. Heinrich
Attorney, Agent, or Firm—Baker & McKenzie

[57] ABSTRACT

A reusable handle for lifting, carrying and pouring for use with containers having a flanged portion. In attaching the handle of this invention, the top handle portion is snapped onto or otherwise affixed to the neck portion of the container.

4 Claims, 1 Drawing Sheet

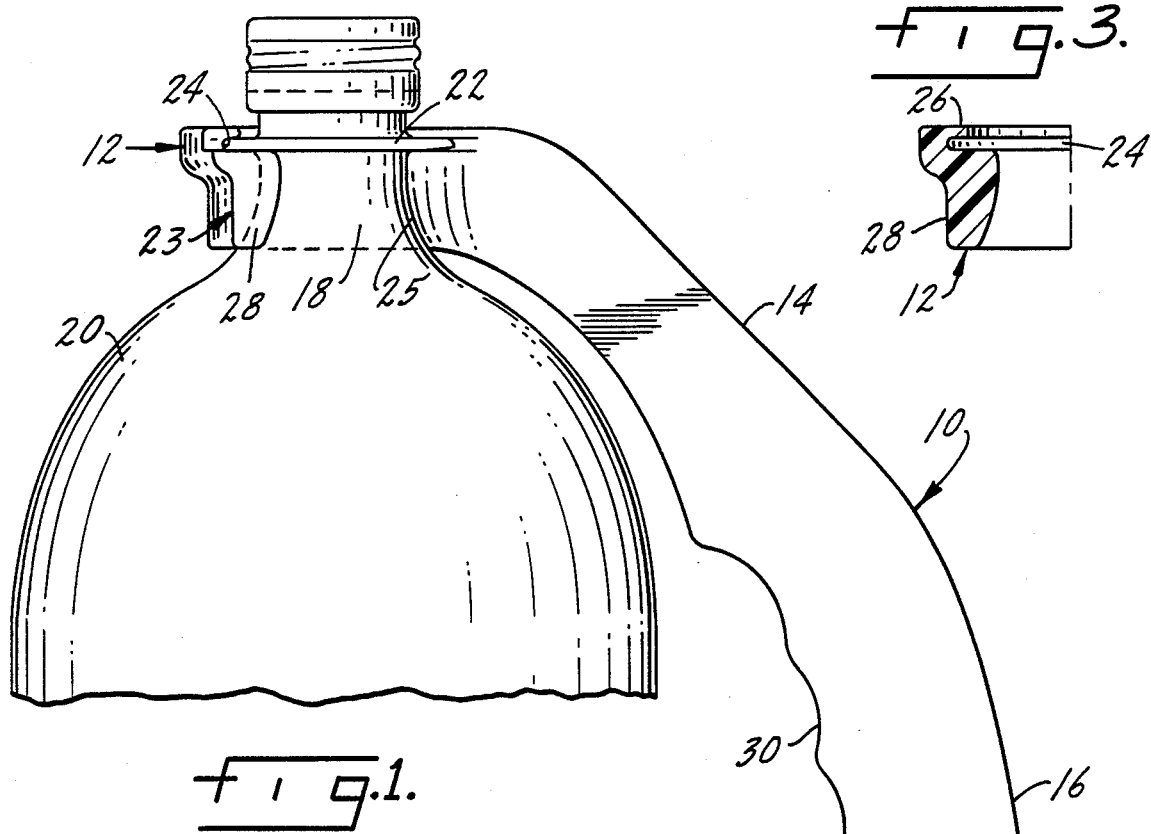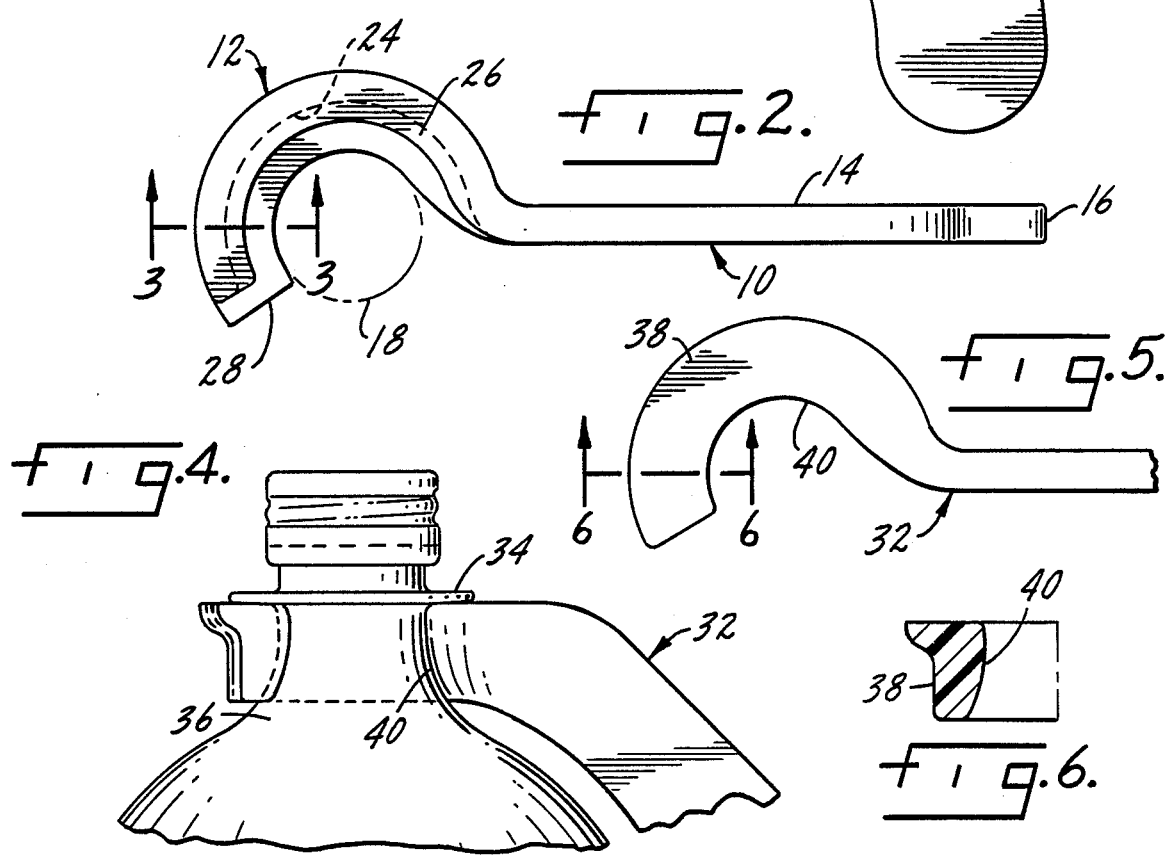

REUSABLE CONTAINER HANDLE

FIELD OF THE INVENTION

This invention relates to a handle for use with containers having a flanged portion. More particularly, the reusable handle of this invention can be quickly and easily secured to any one of a number of flanged containers, thereby providing a convenient handle for gripping, carrying or pouring.

BACKGROUND OF THE INVENTION

Soft drink manufacturers have begun using plastic containers for their products, because compared to glass, plastic is typically more impact resistent, lighter, and less costly. Due to economic considerations and consumer demand, these plastic containers are often quite large, and typically have a capacity of about two liters.

As a result, the filled containers can be quite heavy and cumbersome to use. The containers can be unmanageable for small children who may not have the coordination to securely hold such containers when attempting to pour themselves a serving of soft drink.

One solution would be to provide integral handles on the containers. However, manufacturing such containers with handles is problematic due to the nature of the plastic bottle manufacturing process; indeed, traditional methods of producing two liter plastic bottles appear to be incompatible with the production of integral handles. Although integral handles are typically impractical, conventional plastic container manufacturing processes often provide the container neck portion with a flange, thereby providing the containers with additional structural integrity.

Attempts to provide handles subsequent to container manufacture have generally taken the form of mechanical fixturing. A variety of discrete handle configurations have been designed which attach to containers by means of bands, adhesives, and the like. Some of these designs allow the handle to be reusable.

Reusable container handles in general have been known for some time. Such handles sometimes grip a container with a friction fit or with a plastic "snap-on" open ring as disclosed in Thompson, U.S. Pat. No. 4,273,246. Sometimes these handles are secured to the container at more than one location.

However, such handles have had problems. Some do not sufficiently secure themselves to containers to be reliable. In use, others are poorly positioned relative to the container, thereby causing the handle to be cumbersome and difficult to use. Other container handles have configurations which are not space efficient and are therefore difficult to use in places such as crowded refrigerators. Other handles can be used with only a very limited number of container designs.

Consequently, it is an object of this invention to create a reusable handle which can be used with any one of a variety of containers having a flanged portion.

A further object of this invention is to create a reusable handle which is reliable, easy to use, durable, and inexpensive to manufacture.

A further object of this invention is to create a reusable handle which provides a comfortable grip.

A further object of this invention is to create a reusable handle which is not prone to slipping.

A further object of this invention is to create a handle which is space efficient, providing easy storage in places such as crowded refrigerators.

Other objects and features of the invention will become apparent to those skilled in the art from the following specification when read in the light of the annexed drawings.

SUMMARY OF THE INVENTION

The reusable handle of this invention utilizes an innovative design which allows the handle to be releasably secured to any one of a multitude of containers having a flanged portion. This handle is preferably contoured close to the outside surface of the container to allow for convenient storage and easy handling. The handle is reliable, inexpensive, and easy to use.

DESCRIPTION OF THE DRAWINGS

The invention is illustrated more or less diagrammatically in the accompanying drawing wherein:

FIG. 1 is a view of the preferred embodiment of the invention disclosing the handle as it would typically appear during home use;

FIG. 2 is a top view of the handle of FIG. 1;

FIG. 3 is a sectional view taken substantially along the line 3—3 of FIG. 2;

FIG. 4 is a view of an alternative embodiment of the invention;

FIG. 5 is a top view of the embodiment shown in FIGURE 4; and

FIG. 6 is a sectional view taken substantial along the line 6—6 of FIG. 5.

DESCRIPTION OF THE PREFERRED EMBODIMENT

Like reference numbers will be used to refer to like parts from Figure to Figure in the following description of the preferred embodiment of the invention.

The container handle is indicated generally at 10 in FIG. 1. As can be seen by this figure, the handle has a top substantially horizontal curved end portion 12, a middle rearwardly and downwardly projecting middle portion 14, and a substantially vertical bottom end portion 16.

When secured to a container 20, as illustrated in FIGURE 1, the handle's top portion 12 engages a portion of the neck 18 (including flange 22) of container 20. The flange 22 extends about a quarter inch from the container neck 18 and engages into handle groove 24.

As can be seen in FIG. 2, the handle's top portion 12 has a circular shape of somewhat greater than 180 degrees. As this curvature extends beyond 180 degrees, the curvature opening becomes smaller providing a smallerspace through which the container neck and flange must be inserted when attaching and detaching the handle to the container. Preferably, the opening is of a sufficient size to provide a snug fit, barely allowing the container neck, including the flanged portion, to be snapped into this top portion of the handle.

As shown in FIG. 3, the top portion 12 has three horizontal components: 1. an upper boundary 26 which is designed to surround the container neck above flange 22; 2. a groove portion 24 into which a portion of the flange can be inserted; and 3. a lower boundary 28 which is designed to surround the container neck below flange 22.

Although a snug fit for each of these three components 24, 26, and 28 would be ideal, such a design would probably lack flexibility for different types of containers. Consequently, only one of the portions is designed primarily for a snug fit and the other two portions provide flexibility. As shown in FIG. 2, the groove portion 24 and upper portion 26 have preferably a somewhat shorter curved length than the lower boundary 28. The lower boundary's additional length (smaller curvature opening) typically gives the handle its tight "snap-on" fit. Because this lower boundary lies directly below the container's rigid flange, the lower boundary secures the handle to the neck of the container, and is restrained from above by flange 22.

The relatively shorter length of the groove portion 24 and upper boundary portion 26 allows for easier attaching and detaching of the handle. Nevertheless, the groove is preferably of a depth and height which will provide a snug interconnecting relationship with the container flange when the handle is secured to the container.

For further ease in connecting and disconnecting, the ends of the groove may be provided with a height somewhat greater than the height of the middle portion of the groove. This provides flexibility in aligning the flange with the groove as the container neck is pushed into the curvature opening of top 12.

As shown at 23, lower boundary 28 has an(inner radius which preferably increases as the lower boundary protrudes downwardly away from groove portion 22./ This allows for additional flexibility, typically providing the handle with a snug fit. The bottom edge of lower boundary 28 is preferably in contacting relationship with the outer surface of the container neck as shown at 25.

The handle is preferably made of a rigid plastic which has a small amount of flexibility, thereby allowing the curved top portion of the handle to flex a little when being snapped onto the container neck.

The handle's middle portion 16 is contoured to the outside surface of the container, allowing about a quarter inch between the outer surface of the container and the middle portion 16 of the handle. This contouring keeps the bottom "gripping" portion of the handle close to the container, and this makes the handle space efficient. By keeping the handle close to the container, there is a diminished possibility that the handle will be accidentally bumped or pushed by activity occurring around the container and handle combination. Also, since the handle is relatively close to the main body of the container, unintentional forces will be less likely to cause a spill, because the handle will have less leverage against the container to tip the container over.

The handle's bottom gripping portion 16 is substantially parallel to the axial plane of the container. Consequently, during use, the operator experiences forces on the handle similar to the forces which would be experienced if the operator were holding the container directly, giving the handle a natural "feel". The handle is contoured to provide a firm secure grip, making the handle very comfortable.

If the handle were angled away from the container, as is done in many known handles, the handle would have an awkward "feel." As the contents are poured from the container, the operator typically concentrates upon the container, if the gripping portion of the handle is not parallel to the container, the forces on the handle will not "feel" the same as if the container were being held directly; instead, the angle of the wrist and placement of the arm will typically feel awkward relative to the movement of the container.

Also since the handle is substantially vertical, it is easy to grasp during use. A hand can typically reach for a handle more comfortably when the handle is vertical than when it protrudes outwardly at an angle.

The lower portion of the handle also has contours 30 which provide for easy gripping and comfortable use because the contours conform to a typical operator's hand. As such, the handle does not have harsh edges which would be uncomfortable for an operator.

As shown in FIGS. 4 and 5, an alternative embodiment 32 of this handle can be snapped onto the bottle neck below the flange 34. Whereas in the previous embodiment, the groove-flange combination substantially precluded container pivoting relative to the handle, in this embodiment, the top portion of the handle is wedged between the flange 34 and the upper main body 36 of the container, and this will also substantially preclude the container from pivoting relative to the handle during use.

As shown in FIG. 6, the snap-on upper portion 38 of this second embodiment does not require a groove. The inner surface 40 of the circular top portion is contoured to have a tight "snap-on" contacting relationship with the outside surface of the container neck.

It should be understood that the foregoing disclosure relates to only the preferred embodiment of the invention and that numerous modifications or alterations may be made therein without departing from the spirit and scope of the invention as set forth in the claims.

I claim:

1. A reusable container handle for releasably securing a container having a flanged neck portion, said handle comprising:
   a substantially horizontal curved top end portion;
   said top end portion further defining an upward horizontal boundary, a middle horizontal groove portion, and a lower horizontal boundary, wherein said lower boundry of said substantially horizontal curved top end portion extends further in a circular pattern than the upper boundry portion of said substantially horizontal curved top end portion;
   said groove portion having a sufficient size and curvature to receive a portion of peripheral boundary of said neck flange of said container;
   said handle further comprising a downwardly and rearwardly protruding middle portion;
   said handle further comprising a bottom end portion.

2. The reusable container handle of claim 1 wherein said bottom portion of said handle is contoured to provide a comfortable hand grip.

3. The reusable container handle of claim 1 wherein said handle comprises a plastic.

4. The reuseable container handle of claim 1 wherein the bottom end portion of said handle is substantially vertical and substantially parallel to the outer surface of said container.

* * * * *